United States Patent
Van Rensburg et al.

(10) Patent No.: US 9,159,098 B2
(45) Date of Patent: Oct. 13, 2015

(54) SYSTEM FOR CLEARING FINANCIAL TRANSACTIONS

(75) Inventors: Johannes Janse Van Rensburg, Stellenbosch (ZA); Cedric Ronald Franz, Cape Town (ZA)

(73) Assignee: Visa Cape Town (PTY) Ltd., Cape Town (ZA)

( * ) Notice: Subject to any disclaimer, the term of this patent is extended or adjusted under 35 U.S.C. 154(b) by 1088 days.

(21) Appl. No.: 12/451,770

(22) PCT Filed: Aug. 22, 2007

(86) PCT No.: PCT/IB2007/002418
§ 371 (c)(1),
(2), (4) Date: May 26, 2010

(87) PCT Pub. No.: WO2008/146077
PCT Pub. Date: Dec. 4, 2008

(65) Prior Publication Data
US 2010/0235277 A1 Sep. 16, 2010

(30) Foreign Application Priority Data
May 30, 2007 (ZA) .................. 2007/04447

(51) Int. Cl.
*G06Q 40/00* (2012.01)
*G06Q 20/40* (2012.01)
(Continued)

(52) U.S. Cl.
CPC ............... *G06Q 40/00* (2013.01); *G06Q 20/04* (2013.01); *G06Q 20/10* (2013.01); *G06Q 20/102* (2013.01);
(Continued)

(58) Field of Classification Search
CPC ..... G06Q 20/10; G06Q 20/102; G06Q 20/04; G06Q 20/40; G06Q 20/02; G06Q 20/023; G06Q 40/00; G06Q 20/042; G06Q 20/108

USPC ....................................................... 705/35, 40
See application file for complete search history.

(56) References Cited

U.S. PATENT DOCUMENTS

| 4,960,981 A | * | 10/1990 | Benton et al. | ................. | 705/41 |
| 7,337,332 B2 | * | 2/2008 | Tsuria et al. | ................. | 713/193 |

(Continued)

FOREIGN PATENT DOCUMENTS

| WO | 0215088 A1 | 2/2002 |
| WO | 2007038593 A2 | 4/2007 |

OTHER PUBLICATIONS

Hunter, A. (1996). Seeking a safety net. ICB, 12(6), 14. Retrieved from http://search.proquest.com/docview/223576158?accountid=14753 on May 13, 2015.*

(Continued)

*Primary Examiner* — Kito R Robinson
(74) *Attorney, Agent, or Firm* — Kilpatrick Townsend & Stockton LLP

(57) ABSTRACT

A system is provided for clearing financial transactions as between banking institutions optionally by way of one or more clearing houses. A plurality of banking institutions are each enabled to communicate directly with each other and with at least one clearing house. Each banking institution has a computerized server programmed to address clearance requests to at least some of the plurality of banking institutions in the system by way of a particular route. The computerized server of at least one banking institution in the system is programmed to route clearance requests selectively and, as may be necessary, sequentially directly to one or more of the other banking institutions and clearing house in the alternative. Selection means associated with the computerized server are provided for selecting a particular one of said at least one other banking institution and clearing house according to a predetermined sequence and typically according to least cost.

10 Claims, 2 Drawing Sheets

(51) Int. Cl.
*G06Q 20/04* (2012.01)
*G06Q 20/02* (2012.01)
*G06Q 20/10* (2012.01)

(52) U.S. Cl.
CPC ............... *G06Q 20/40* (2013.01); *G06Q 20/02* (2013.01); *G06Q 20/023* (2013.01); *G06Q 20/042* (2013.01); *G06Q 20/108* (2013.01)

(56) References Cited

U.S. PATENT DOCUMENTS

| | | | | |
|---|---|---|---|---|
| 8,583,492 | B2* | 11/2013 | Connell | 705/16 |
| 2002/0026365 | A1* | 2/2002 | Natanzon | 705/16 |
| 2004/0236677 | A1* | 11/2004 | Tyson-Quah | 705/38 |
| 2004/0236692 | A1* | 11/2004 | Sellen et al. | 705/45 |
| 2005/0027648 | A1* | 2/2005 | Knowles et al. | 705/38 |
| 2006/0036540 | A1 | 2/2006 | Lawrence et al. | |

OTHER PUBLICATIONS

Dembitz, A. (1996). Interbank support. Central European, 6(2), 20. Retrieved from http://search.proquest.com/docview/231720793?accountid=14753 on May 13, 2015.*

* cited by examiner

SYSTEM FOR CLEARING FINANCIAL TRANSACTIONS

CROSS REFERENCE TO RELATED APPLICATIONS

The present application is a National Phase Application of International Application No. PCT/IB2007/002418 filed Aug. 22, 2007, which claims priority to South African Patent Application No. 2007/04447, filed May 30, 2007, which applications are incorporated herein fully by this reference.

FIELD OF THE INVENTION

This invention relates to a system for clearing financial transactions as between different financial institutions, particularly banking institutions.

BACKGROUND TO THE INVENTION

The clearing of financial transactions as between different banking institutions has, for many years, been carried out through the medium of an independent clearing house. Thus, a banking institution, the collecting banking institution in this instance, that receives a request (in any one of a variety of different forms) to credit a particular client's (payee's) bank account with funds originating from a payer that is a client of a different banking institution, the paying banking institution in this instance, will initiate collection of the funds by directing the relevant information to a clearing house.

The clearing house will, in turn, direct the information to the paying banking institution that will either accept or decline the transaction. If the transaction is accepted, the clearing house notifies the collecting banking institution to this effect and the transaction becomes cleared with the payees bank account at the paying banking institution being debited with the relevant amount and the payee's bank account at the collecting banking institution being credited with the relevant amount.

This system operates effectively and it has become accepted that such a settlement procedure is a necessary part of all transactions between different banking institutions. However, the procedure is costly in that the clearing house charges for their services and the charges may be deleterious to the business of a banking institution, particularly a smaller banking institution.

OBJECT OF THE INVENTION

It is an object of this invention to provide a system for clearing financial transactions in which costs of clearing transactions can be diminished, at least to some extent.

SUMMARY OF THE INVENTION

In accordance with this invention there is provided a system for clearing financial transactions in which a plurality of banking institutions are each enabled to communicate with each other and with at least one clearing house and each banking institution has a computerised server programmed to address clearance requests to at least some of the plurality of banking institutions in the system by way of a particular route, the system being characterised in that the computerised server in respect of at least one banking institution in the system is programmed to route clearance requests selectively and, as may be necessary, sequentially to one or more of said at least one other banking institution directly and a clearing house in the alternative and wherein selection means associated with the computerised server are provided for selecting a particular one of said at least one other banking institution and clearing house according to a predetermined sequence.

Further features of the invention provide for the selection means to include a priority list in respect of each of said banking institutions wherein the selection means initially selects a route directly to a first of said other banking institutions and, in the event that the relevant transaction clearance is rejected for any reason, the selection means thereafter selects a route either directly to a second of said other banking institutions or alternatively to a clearing house; for the system to include more than one clearing house that can be used in the alternative and that are also prioritised alongside other banking institutions in the priority list; for the priority list to be configured such that a clearing house is available as a last resort (default) clearing facility in respect of at least one of said priority lists of said banking institutions; for the identity of the banking institutions to be their banking institution number (BIN); for the priority list to include an IP address for each of said other banking institutions; and for the order of said banking institutions in said priority list to be based on cost effectiveness with the least cost routing being the first alternative to be selected in respect of each transaction.

Still further features of the invention provide for selection means to include a routing table in which a sequence is set out for transactions on the basis of one or more factors or characteristics of the particular transaction to be sent for clearance, said factors or characteristics being selected from the identity of the said other banking institution, the value of the transaction to be sent for clearance, the identity of the payer, the identity of the payee and, most importantly, the cost of clearance by way of alternative available routes; and for the routing table to be set up such that the possible banking institutions and clearing houses are identified in a sequence commencing with the least cost route and ending with the highest cost route.

In order that the invention may be more fully understood further description and some examples thereof will now be made with reference to the accompanying drawings.

DETAILED DESCRIPTION WITH REFERENCE TO THE DRAWINGS

Figure 1:
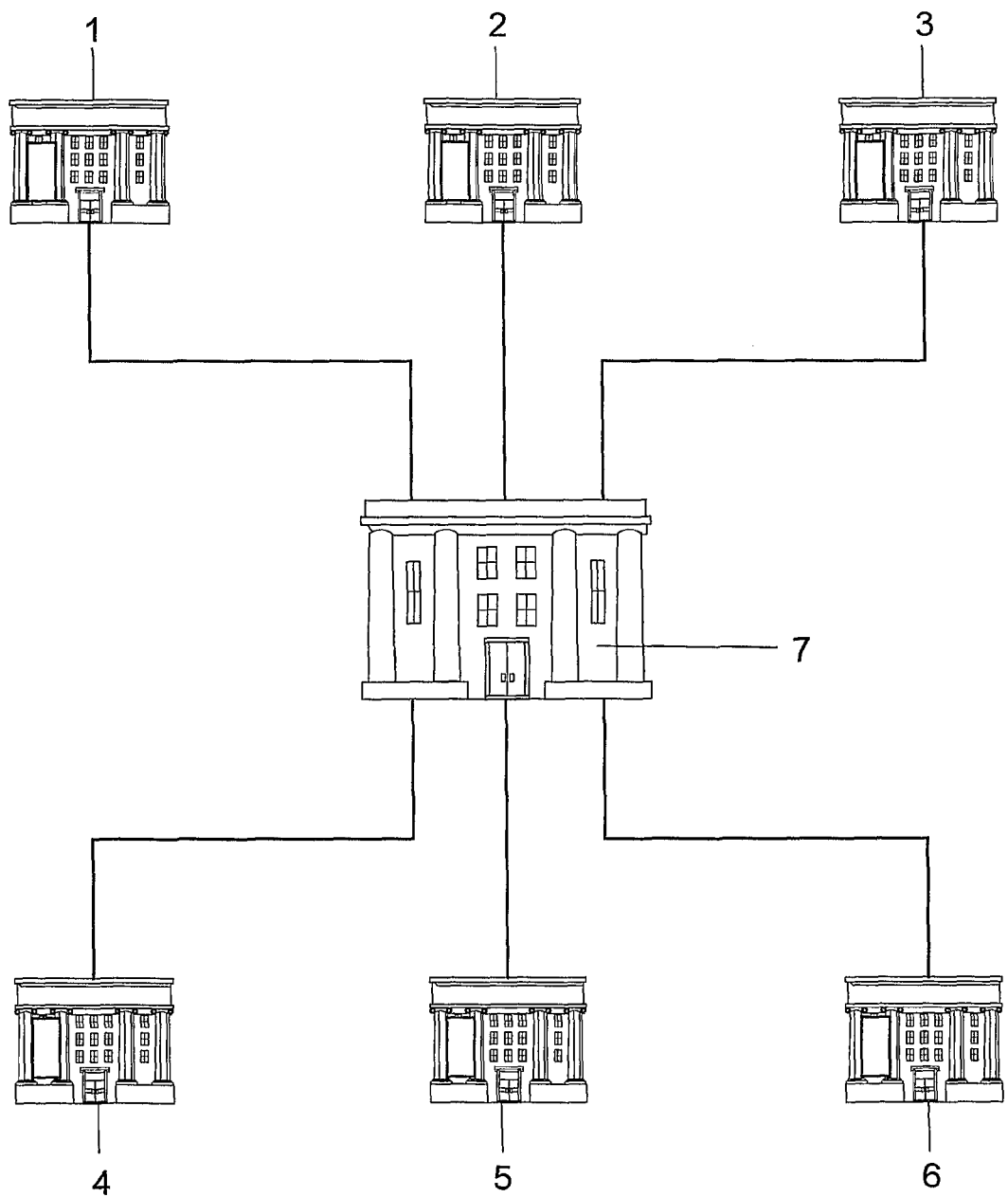
FIG. 1 is a schematic illustration showing the prior art conventional approach to transaction clearance; and, FIG. 2 is a schematic illustration showing the approach to transaction clearance according to the system of the present invention.

In the prior art situation that is illustrated in FIG. 1, a theoretical system may include six different banking institutions indicated by numerals (1) through (6), that are enabled to transact with each other exclusively by way of a clearing house (7). Thus, any request for settlement of a financial transaction from any one of the banks to another is, in the first place, routed to the clearing house that then routes it to the other bank. The clearing house receives the other bank's response and forwards it to the collecting banking institution.

Figure 2:
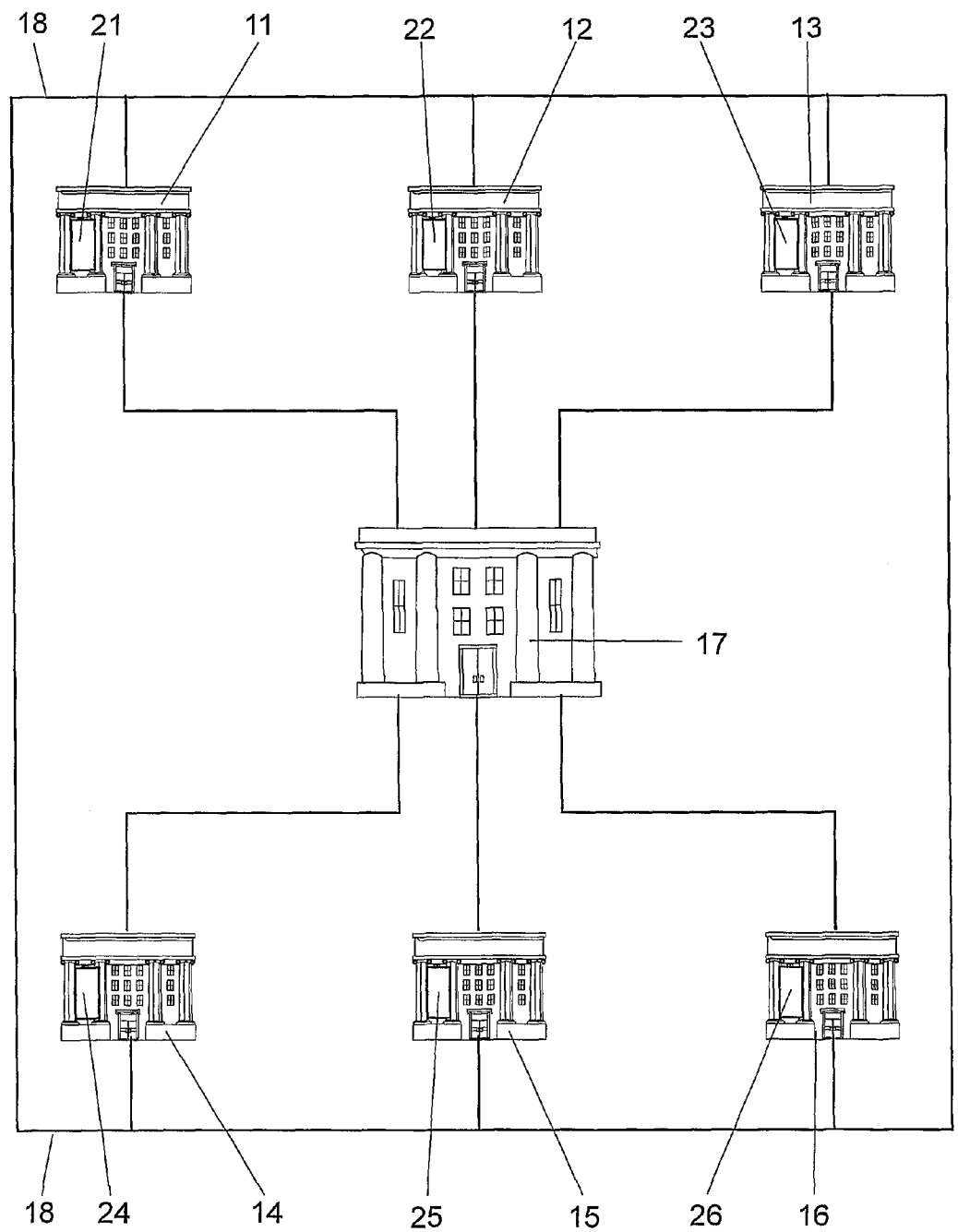

In contradistinction to the existing system, and with reference to FIG. 2 of the drawings, a theoretical system according to the present invention may comprise the same six different banking institutions, in this instance indicated by numerals (11) to (16), that are, as before, enabled to communicate settlement requests to a clearing house (17). However, as provided by this invention, each of the banking institutions is furthermore enabled to communicate directly with each other, as indicated by numeral (18) without any reference to the clearing house.

There are thus a number of different routes available to a collecting banking institution (say banking institution (11)) to direct settlement requests to a paying banking institution (say banking institution (14)). These routes include a route directly from the collecting banking institution (11) to the paying banking institution (14); a route directly to a different banking institution (that is, any one of banking institutions (12), (13), (15), and (16)) that in turn is able to direct the same settlement request directly to the paying banking institution (14) or to the paying banking institution by way of a still further intervening banking institution; and a route by way of the clearing house.

Each banking institution has a computerised server indicated by numerals (21) through (26) programmed to route clearance requests to a selected one of the other banking institution directly, or to the clearing house, according to selection means that, in this instance, includes a priority list that is stored on a memory associated with the computerised server.

The priority list may be a fixed priority list based exclusively on the identity of the paying banking institution or it may be a more complex priority list that is created for each transaction according to its characteristics. Such characteristics may be selected from the identity of the said other banking institution, the value of the transaction to be sent for clearance, the identity of the payer, the identity of the payee and the cost of clearance by way of the various alternative routes available.

The priority list and cost could be calculated in respect of each transaction or, alternatively, in respect of ranges of transactions, typically based on the value of the transaction.

Thus, for example, an arrangement between two banking institutions may be that direct settlement is agreed upon for transactions below a predetermined maximum value. The agreement may be more complex and agree that direct settlement is agreed upon for transactions in which the payor or the payee are predetermined customers, for example, a supermarket chain.

Whatever the terms and conditions agreed upon may be, the computerised server of the collecting banking institution will determine a priority list for the particular transaction or will employ a fixed priority list according to the transaction characteristics and will generally route a settlement request, in the first place, directly to the paying financial institution. Should this settlement request be rejected, the collecting banking institution's computerised server will proceed to the next sequential route that may, for example, be by way of one of the other banking institutions, say banking institution (15). In this instance the settlement request is routed to the said other banking institution (15) from the collecting banking institution (11) and thence to the paying banking institution (14). It will be understood that the arrangement between the paying banking institution (14) and the intervening banking institution (15) may be different from the arrangement between the collecting banking institution (11) and the paying banking institution (14) and therefore such a settlement request may be successful and of lowest cost.

At one or other stage the priority list will indicate that settlement in respect of a transaction should be directed to the clearing house, typically as a last resort routing for the settlement request. Of course, it is always possible that settlement by way of the clearing house will be more cost-effective than a more complex route. In any event, the priority list would preferably prioritise the routes available according to cost so that in respect of some transactions, the clearing house may be the most cost effective route. However, as a general rule, it is envisaged that a routing directly to one of the other banking institutions will be the most cost-effective and will generally be governed by an agreement between the two banking institutions concerned.

Nevertheless, it will be understood that whilst reference is made to only one clearing house in the description of the invention set out above, the system may include a plurality of different clearing houses that may also be prioritised in amongst the other banking institutions according to selected parameters, typically, the overall cost of the transaction. It is envisaged that this characteristic that accompanies implementation of the present invention can lead to competition between different clearing houses and that in itself may lead to costs of using a clearing house being decreased.

It will also be understood that the direct settlement of transactions between banking institutions enables real time clearing of transactions to be effected with attendant advantages, particularly to the payee in that the relevant funds can be made available sooner than in instances in which transactions cleared through a clearing house only become available at a later time and typically, one or two days later.

In order to implement the above, selection means including, in this instance, the priority list that conveniently assumes the form of the routing table, will preferably identify the various banking institutions by way of their banking institution number (BIN) and will include an Internet protocol (IP) address for each of them. The banking institution number in respect of an ultimate default clearing house may conveniently be 00000000.

Simply by way of example, a simple routing table could assume the following form:—

| BIN | IP | Order |
|---|---|---|
| 10101002 | 10.10.10.2 (Bank 2) | 1 |
| 10101003 | 10.10.10.3 (Bank 3) | 2 |
| 00000000 | 10.10.10.4 (Clearing House) | default |

Routing software stored on the memories associated with the servers at the banking institutions may instruct each server processor to read its own routing table and set up the network connections to each bank in the routing table. These connections could use standard financial protocols such as ISO8583, Base24, Swift etc. The software in turn will also instruct the processor to monitor incoming connections from other financial institutions for clearance requests. The banking system is setup so that each banking institution first consults the software stored on the memory associated with its own server rather than the clearing house to which it would normally have connected directly.

When a transaction that is not intended for it is received by the relevant banking institution, the BIN number of the sending bank is identified from the transaction. Then the transaction is routed to the routing software. The routing software then sends the transaction to the first bank in the "order" specified in the routing table. If that bank rejects the transaction with an invalid destination error, the routing software then sends the transaction to the next bank in the routing table. It continues sending the transaction to each bank in the routing table sequentially whenever the transaction is returned with an invalid destination error or until the routing table is exhausted.

In practice then, and simply by way of illustration, in respect of a transaction having the following details:—

| Transaction Details | |
|---|---|
| Receiving Bank | Bank 1 |
| Payer | Bank 2 |
| Payee | Bank 1 |
| Amount | 200 |

Bank 1's Routing table may look as follows:—

| BIN | IP | Order |
|---|---|---|
| 10101002 | 10.10.10.2 (Bank 2) | 1 |
| 10101003 | 10.10.10.3 (Bank 3) | 2 |
| 00000000 | 10.10.10.4 (Clearing House) | default |

The routing software of Bank 1 looks in its routing table and sends the transaction directly to Bank 2, having been described the number one place for the "order" allocation and, in this instance, Bank 2 accepts the transaction as being within the agreed characteristics thus saving clearing house costs.

However, the characteristics may fall outside of an agreed situation in which instance the following situation could arise.

| Transaction Details | |
|---|---|
| Receiving Bank | Bank 1 |
| Payer | Bank 2 |
| Payee | Bank 1 |
| Amount | 200 |

| Bank 1's Routing table | | |
|---|---|---|
| BIN | IP | Order |
| 10101002 | 10.10.10.2 (Bank 2) | 1 |
| 10101003 | 10.10.10.3 (Bank 3) | 2 |
| 00000000 | 10.10.10.4 (Clearing House) | default |

In this instance Bank 1 and Bank 2 have agreed to the direct clearance of transactions in respect of amounts not exceeding 100. The routing software of Bank 1 looks in its routing table and sends the transaction directly to Bank 2, as in the previous instance. However, Bank 2 declines the transaction because the amount exceeds that of the agreement between the two banks. The routing software of Bank 1 then tries the second route in the predetermined "order" by sending the transaction to Bank 3. Bank 3 then looks in its routing table and sends the transaction on to Bank 2. The agreement between Bank 3 and Bank 2 may be such that the transaction falls in the agreement in which instance settlements can take place via this route.

However, in the event that the transaction falls outside of the agreement between Bank 3 and Bank 2 the transaction will again be declined in which instance the transaction will then be at last sent to the default clearing house being the last route available in the routing table.

It will be understood that the invention can be implemented in numerous different ways and that the aforegoing is simply illustrative of the principles of the invention.

The invention claimed is:

1. A system for clearing financial transactions comprising: a computerized server of a banking institution enabled to communicate with computerized servers of other banking institutions and with a computerized server of a clearing house, wherein the computerized server of the banking institution is programmed to address clearance requests to at least two computerized servers of at least two of the other banking institutions, wherein the at least two other banking institutions are banking institutions other than clearing house institutions;

wherein the computerized server of the banking institution is programmed to route clearance requests selectively and sequentially to the at least two computerized servers of the at least two other banking institutions directly instead of first routing the clearance requests to the computerized server of the clearing house, and wherein the computerized server comprises a means for selecting a particular one of said at least two other banking institutions and the clearing house according to a predetermined sequence, in which the means for selecting includes a priority list, wherein the priority list includes IP addresses for computerized servers of said banking institutions and bank institution numbers for the banking institutions, and wherein the means for selecting initially selects a route directly to a first IP address of the computerized server of a first of said at least two other banking institutions and, in the event that the relevant transaction clearance is rejected for any reason by the computerized server of the first of said at least two other banking institutions, the means for selecting thereafter selects a route either directly to a second IP address of a second computerized server of a second of said at least two other banking institutions or alternatively to a third IP address of the computerized server of the clearing house in accordance with said predetermined sequence.

2. A system as claimed in claim 1 in which the system includes more than one computerized server of more than one clearing house that can be used in the alternative and wherein computerized servers of the clearing houses are prioritized alongside other banking institutions in the priority list.

3. A system as claimed in claim 1 in which the priority list is configured such that the computerized server of the clearing house is available as a last resort clearing facility.

4. A system as claimed in claim 1 in which the order of said computerized servers of the banking institutions in said priority list is based on cost effectiveness with the least cost routing being the first alternative to be selected in respect of each transaction.

5. A system as claimed in claim 1 in which the means for selecting includes a routing table in which a sequence is set out for transactions on the basis of one or more factors or characteristics of the particular transaction to be sent for clearance, said factors or characteristics being selected from the group consisting of the identity of the said other banking institution, the value of the transaction to be sent for clearance, the identity of the payer, the identity of the payee, and the cost of clearance by way of alternative available routes.

6. A system as claimed in claim 5 in which the routing is set up such that the possible banking institutions and clearing houses are identified in a sequence commencing with the least cost route and ending with the highest cost route.

7. A system as claimed in claim 1 in which the banking institution is a collecting banking institution and wherein at least one of the at least two other banking institutions is a paying banking institution, and wherein the computerized server of the collecting banking institution determines the priority list for a particular transaction.

8. The system of claim 1 further comprising:
the plurality of other computerized servers of other banking institutions in direct communication with the computerized server of the banking institution; and
the computerized server of the clearing house.

9. A method comprising:
receiving a clearance request by a computerized server of a banking institution enabled to communicate with computerized servers of other banking institutions and with a computerized server of a clearing house, wherein the computerized server of the banking institution is programmed to address clearance requests to at least two computerized servers of at least two of the other banking institutions, wherein the at least two other banking institutions are banking institutions other than clearing house institutions, wherein the computerized server of the banking institution is programmed to route clearance requests selectively and sequentially to the at least two computerized servers of the at least two other banking institutions directly instead of first routing the clearance requests to the computerized server of the clearing house, and wherein the computerized server comprises a means for selecting a particular one of said at least two other banking institutions and the clearing house according to a predetermined sequence, in which the means for selecting includes a priority list, wherein the priority list includes IP addresses for the computerized servers of said banking institutions and bank institution numbers for the banking institutions, wherein the means for selecting initially selects a route directly to a first IP address of the computerized server of a first of said at least two other banking institutions, and, in the event that the relevant transaction clearance is rejected for any reason by the computerized server of the first of said at least two other banking institutions, the means for selecting thereafter selects a route either directly to a second IP address of a second computerized server of a second of said at least two other banking institutions or alternatively to a third IP address of the computerized server of the clearing house in accordance with said predetermined sequence; and routing, by the server computer, the clearance request directly to the first IP address of the first computerized server of the first of said at least two financial institutions, instead of routing the clearance request to the clearing house.

10. The method of claim 9 in which the priority list is configured such that the computerized server of the clearing house has the lowest priority the priority list.

* * * * *